United States Patent [19]

Hawker

[11] 4,236,762
[45] Dec. 2, 1980

[54] FULL POWER HYDRAULIC BRAKING SYSTEMS FOR TRACTOR-TRAILER COMBINATIONS

[75] Inventor: Michael J. Hawker, Lincoln, England

[73] Assignee: Clayton Dewandre Company Limited, Lincoln, England

[21] Appl. No.: 966,210

[22] Filed: Dec. 4, 1978

[51] Int. Cl.³ .............................................. B60T 13/00
[52] U.S. Cl. .......................................... 303/7; 303/9; 303/85
[58] Field of Search ...................... 303/7, 9, 27, 58, 59, 303/64, 65, 85, 86; 92/86; 188/3 R

[56] References Cited

U.S. PATENT DOCUMENTS

| | | | |
|---|---|---|---|
| 3,574,413 | 4/1971 | Euga | 303/9 |
| 3,768,371 | 10/1973 | Orme | 92/86 |

*Primary Examiner*—Reinhard J. Eisenzopf
*Attorney, Agent, or Firm*—Woodard, Weikart, Emhardt & Naughton

[57] ABSTRACT

A tractor-trailer hydraulic braking system in which the tractor braking circuit and trailer braking circuit are inter-connected by releasable hydraulic couplings including both service and emergency line connections each with its associated return line. The trailer circuit also includes a pressure storage unit or accumulator and a emergency valve operable to apply the trailer brakes in the event of loss of emergency line pressure. To avoid leak down of the accumulator over a period following de-coupling of the trailer an expansion tank or chamber is connected into the trailer circuit so as to receive fluid leaking into the return lines from the accumulator and to retain such fluid until the pump can return it to the accumulator.

2 Claims, 2 Drawing Figures

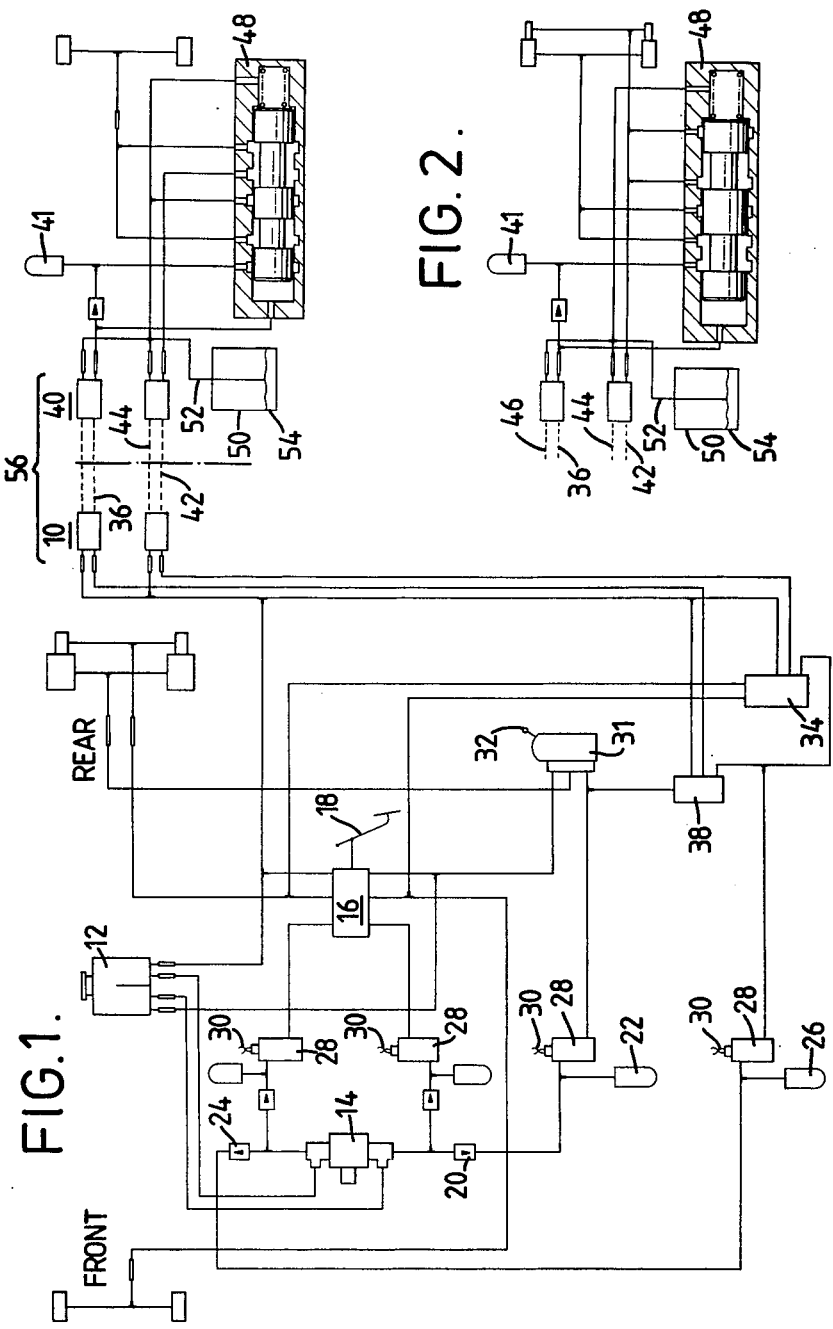

FULL POWER HYDRAULIC BRAKING SYSTEMS FOR TRACTOR-TRAILER COMBINATIONS

This invention relates to full power hydraulic braking systems for tractor-trailer combinations and which comprise a tractor braking circuit and a trailer braking circuit inter-connected by releasable hydraulic couplings, the tractor section including two brake circuits, preferably fed from a dual hydraulic pump, and each embodying flow and return lines, a pressure storage unit or accumulator in each circuit, a dual brake valve metering pressurised fluid from the accumulators in dependance on applied pedal effort, and relay valve means triggered by the outputs of the brake valve and metering pressure fluid to the trailer brakes. Such systems normally include both service and emergency line connections between the tractor and the trailer, each with its associated return line, the trailer circuit also comprising its own pressure storage unit or accumulator and an emergency valve operable to apply the trailer brakes in the event of loss of pressure in the emergency line. However, when the trailer is de-coupled from the tractor the accumulator in the trailer circuit is liable to leak down over a period by forcing the pressurised fluid past the valve seats and seals into the return line resulting in the return line going to accumulator pressure and then gradually leaking fluid to atmosphere, and it is the object of the present invention to provide an improved trailer circuit which overcomes this defect.

According to the invention, in a tractor-trailer braking system as above described, an expansion tank or chamber is connected into the trailer circuit in such a manner as to receive any fluid leaking into the return lines from the accumulator and to retain such fluid until the pump of the connected tractor can return it to the accumulator.

Embodiments of the invention will now be described by way of example with reference to the accompanying drawings of which:

FIG. 1 shows a first embodiment of tractor trailer braking circuit according to the invention and FIG. 2 shows a second embodiment of system for use with spring brake actuators.

In the embodiment of FIG. 1, the tractor circuit 10 comprises a dual oil storage reservoir 12 supplying the input to a dual hydraulic pump 14 the output of which feeds two storage circuits, e.g. for front and rear wheel brakes respectively, and a dual brake valve 16 metering pressure fluid to the brakes according to the effort applied to the brake valve pedal 18. The pump front brake output also feeds through a non-return valve 20 a pressure storage circuit containing accumulator 22 for a parking brake and the pump rear brake output also feeds through a non-return valve 24 a pressure storage circuit containing accumulator 26 for the relay valves which control the trailer brakes. The various circuits contain filters 28 and also pressure switches 30 to give a warning should a fault lead to low storage pressure. The parking brake 31 is of the spring-applied, fluid pressure-release type, the release being under control of a hand operated valve 32. The two outputs of the dual brake valve 16 are also used to trigger a dual relay valve 34 whose single power input is metered to the trailer brakes according to brake valve output pressure and thus according to pedal effort. Automatic application of the trailer brakes should a trailer brake-away occur is achieved by the use of an emergency line 36 which is always pressurised on the tractor and also on the trailer when coupled. If the emergency line 36 becomes broken or disconnected the trailer brakes are applied. The tractor emergency line is taken from a single output relay 38 which is triggered continuously by the pressure in the parking circuit pressure source, failure of which leads to application of both tractor and trailer parking brakes.

The trailer circuit 40 includes an accumulator 41 or pressure storage unit, service 42 and emergency 36 lines, each with its associated return line 44 and 46, and an emergency valve 48, the arrangement being such that with the tractor relay valve in the normal position, i.e. the trailer coupled to the tractor, and high pressure in the emergency line 36, the trailer accumulator will be connected to and charged by the emergency line. The service line 42 is connected to the trailer brakes and will apply them according to pressure in the service line which, in turn, results from application of the tractor brakes. Should pressure at the emergency line 36 connection fall below a specific value, due, for example, to disconnection or trailer brake-away, the accumulator 41 acting through emergency valve 48 will apply the trailer brakes.

For the purpose of the present invention an expansion chamber 50 is connected to the service and emergency return lines 44 and 46 whereby any fluid forced by the accumulator 41 past valve seats or seals into the return lines is collected and retained in this chamber 50 until returned to the accumulator 41 by the pump of the coupled tractor. The provision of such an expansion chamber also has the advantage of preventing fluid transfer from tractors and trailers in a fleet operation.

The chamber 50 is very simple in concept, being an airtight box with an inlet pipe 52 coming down into it and terminating some distance from the bottom. On initial filling and bleeding of the system this box will fill with oil to the level 54 of the end of the inlet pipe, with air being returned through the inlet pipe into the return line and back to the reservoir on the tractor. When the trailer is uncoupled and left standing then oil may leak from the pressurised accumulator 41 into the return lines, so that, without the expansion chamber 50, these lines would all go to, say 2500 psi, and leakage would occur past the low pressure seals in the couplings. With the expansion chamber 50 in the return line having a large air capacity, then the accumulator oil leaking into the chamber will raise the pressure in the chamber to, say 50 psi, (depending on the size of the chamber), so that the maximum pressure in the return lines will be 50 psi, and the trailer may be left standing indefinitely in this condition.

On re-coupling to a trailer, the 50 psi in the expansion chamber 50 will force the surplus oil out of the chamber through the return line to the reservoir on the tractor. This will be a steadily diminishing flow as the pressure drops in the expansion chamber. At the same time as this return flow is taking place the trailer accumulator is being charged up by the tractor system accumulators, which are then themselves replenished when the engine is started, by the pump. Thus, shortly after coupling, the trailer system is back to its operational state, with its accumulator charged and its expansion chamber at minimum level again. There has been no net transfer of fluid between tractor and trailer, this being one advantage of a braking system according to the present invention.

The hydraulic couplings 56 between the tractor and trailer circuits comprise complementary male and female components and may be of the construction described in our co-pending United Kingdom application 46233/77, (corresponds to U.S. application Ser. No. 966,209 filed Dec. 4, 1978) the coupling components on the trailer being one male and one female whereby when a trailer is disconnected the two coupling components thereon can be connected together so ensuring that no pressure is trapped in the trailer emergency line.

I claim:

1. A full power hydraulic braking system for tractor-trailer combinations comprising a tractor braking circuit and a trailer braking circuit inter-connected by releasable hydraulic couplings, the tractor circuit including two brake circuits fed from a hydraulic pump, each embodying flow and return lines and a pressure storage unit, a dual brake valve metering pressure fluid from the pressure storage units in dependence upon applied pedal effort and a relay valve triggered by the outputs of the brake valve and metering pressure fluid to the brakes, the trailer circuit including a pressure storage unit, wherein an expansion chamber is connected into the trailer circuit so as to receive any fluid leaking into the return lines from the pressure storage unit of the trailer circuit when the hydraulic couplings are uncoupled and to retain such fluid until the pump can return it to one of the pressure storage units when the hydraulic couplings are coupled.

2. A braking system according to claim 1 wherein the expansion chamber is sealed and has an inlet pipe connected to the return lines and opening into the chamber at a predetermined distance from the bottom of the chamber.

* * * * *